(12) United States Patent
Chanavat (10) Patent No.: US 11,270,381 B2
(45) Date of Patent: Mar. 8, 2022

(54) ENVIRONMENTAL, SOCIAL AND CORPORATE GOVERNANCE LINKED DEBT INSTRUMENTS

(71) Applicant: REFINITIV US ORGANIZATION LLC, New York, NY (US)

(72) Inventor: Andre Chanavat, London (GB)

(73) Assignee: REFINITIV US ORGANIZATION LLC, New York, NY (US)

( * ) Notice: Subject to any disclaimer, the term of this patent is extended or adjusted under 35 U.S.C. 154(b) by 55 days.

(21) Appl. No.: 16/423,957

(22) Filed: May 28, 2019

(65) Prior Publication Data

US 2019/0318428 A1    Oct. 17, 2019

Related U.S. Application Data

(62) Division of application No. 15/285,526, filed on Oct. 5, 2016, now Pat. No. 10,346,920, which is a division of application No. 13/768,058, filed on Feb. 15, 2013, now Pat. No. 9,466,084.

(51) Int. Cl.
  *G06Q 40/06* (2012.01)
  *G06Q 30/02* (2012.01)
  *G06Q 40/02* (2012.01)

(52) U.S. Cl.
  CPC ......... *G06Q 40/06* (2013.01); *G06Q 30/0207* (2013.01); *G06Q 40/02* (2013.01)

(58) Field of Classification Search
  CPC ........ G06Q 10/00; G06Q 20/00; G06Q 30/00; G06Q 40/00; G06Q 40/06; G06Q 30/0207; G06Q 40/02

USPC ....................................................... 705/3–44
See application file for complete search history.

(56) References Cited

U.S. PATENT DOCUMENTS

| | | | |
|---|---|---|---|
| 5,537,314 A | 7/1996 | Kanter | |
| 6,301,574 B1 | 10/2001 | Thomas et al. | |
| 7,249,051 B1 | 7/2007 | Jenniges et al. | |
| 7,440,919 B2 | 10/2008 | Odegaard et al. | |
| 7,818,233 B1 * | 10/2010 | Sloan .................... | G06Q 40/06 705/36 R |
| 7,996,296 B2 | 8/2011 | Lange | |
| 8,010,395 B2 | 8/2011 | Barnard et al. | |

(Continued)

OTHER PUBLICATIONS

West, Oliver, "Votorantim Cimentos sees ESG 'point of no return' after domestic SLB innovation", Global Capital Euromoney Institutional Investor PLC, ISSN 20552165, Apr. 29, 2021.*

(Continued)

*Primary Examiner* — Frantzy Poinvil
(74) *Attorney, Agent, or Firm* — Katy Chan-Parsons; Bartholomew J. DiVita (57) ABSTRACT

Systems and techniques for structuring and analyzing a fixed-income security are disclosed. The fixed-income security includes a coupon that provides at least a variable rate of interest payment over a time interval. The variable rate of interest payment may be based at least in part on a set of environmental, social, and governance ("ESG") goals defined for an issuer over the time interval. A set of ESG values associated with performance of the issuer and corresponding to the set of ESG goals may be reported, independently audited, and used to determine the variable rate of interest payment provided by the security.

15 Claims, 6 Drawing Sheets

(56) References Cited

U.S. PATENT DOCUMENTS

| | | | |
|---|---|---|---|
| 8,073,760 B2* | 12/2011 | Somech | G06Q 40/02 705/36 R |
| 8,191,776 B2* | 6/2012 | Ben-Zvi | G06Q 20/349 235/380 |
| 8,498,916 B2* | 7/2013 | Somech | G06Q 40/06 705/36 R |
| 8,566,197 B2 | 10/2013 | Satyavolu et al. | |
| 8,577,778 B2* | 11/2013 | Lange | H01L 21/28061 705/37 |
| 8,589,276 B2 | 11/2013 | Arnott et al. | |
| 8,620,788 B2* | 12/2013 | Biske | G06Q 40/02 705/35 |
| 8,812,379 B2* | 8/2014 | Torre | G06Q 40/06 705/30 |
| 9,466,084 B2 | 10/2016 | Chanavat | |
| 2005/0010510 A1* | 1/2005 | Brose | G06Q 40/00 705/35 |
| 2005/0027632 A1* | 2/2005 | Zeitoun | G06Q 40/06 705/36 R |
| 2005/0144022 A1 | 6/2005 | Evans | |
| 2007/0233587 A1 | 10/2007 | Unrath | |
| 2009/0012809 A1* | 1/2009 | Beckers | G06Q 10/10 705/320 |
| 2010/0185561 A1* | 7/2010 | Torre | G06Q 40/00 705/36 R |
| 2010/0280935 A1* | 11/2010 | Fellowes | G06Q 40/00 705/35 |
| 2011/0014969 A1 | 1/2011 | Nicely | |
| 2012/0004965 A1 | 1/2012 | Satyavolu et al. | |
| 2012/0232976 A1 | 9/2012 | Calman et al. | |
| 2013/0117199 A1 | 5/2013 | Arnott et al. | |
| 2013/0238487 A1* | 9/2013 | Biske | G06Q 40/02 705/39 |
| 2013/0246310 A1 | 9/2013 | Weiss et al. | |
| 2013/0282622 A1* | 10/2013 | Somech | G06Q 40/04 705/36 R |
| 2013/0325667 A1 | 12/2013 | Satyavolu et al. | |
| 2013/0325681 A1 | 12/2013 | Somashekar et al. | |
| 2014/0236859 A1 | 8/2014 | Chanavat | |
| 2017/0024822 A1 | 1/2017 | Chanavat | |

OTHER PUBLICATIONS

Final Office Action Received for U.S. Appl. No. 13/768,058, dated Jan. 5, 2015, 9 pages.
Final Office Action Received for U.S. Appl. No. 13/768,058, dated Jan. 20, 2016, 9 pages.
Non-Final Office Action Received for U.S. Appl. No. 13/768,058, dated Aug. 14, 2015, 8 pages.
Non-Final Office Action Received for U.S. Appl. No. 13/768,058, dated Feb. 27, 2014, 7 pages.
Non-Final Office Action Received for U.S. Appl. No. 13/768,058, dated Jul. 24, 2014, 5 pages.
Notice of Allowance Received for U.S. Appl. No. 13/768,058, dated Aug. 31, 2016, 9 pages.
Requirement for Restriction/Election Received for U.S. Appl. No. 13/768,058, dated Nov. 5, 2013, 7 pages.
Response to Non-Final Office Action Filed on May 27, 2014 for U.S. Appl. No. 13/768,058, dated Feb. 27, 2014, 9 pages.
Response to Non-Final Office Action Filed on Nov. 9, 2015 for U.S. Appl. No. 13/768,058, dated Aug. 14, 2015, 13 pages.
Response to Non-Final Office Action Filed on Oct. 24, 2014 for U.S. Appl. No. 13/768,058, dated Jul. 24, 2014, 12 pages.
Response to Restriction/Election Filed on Jan. 2, 2014 for U.S. Appl. No. 13/768,058, dated Nov. 5, 2013, 1 page.
Ex Parte Quayle Action Received for U.S. Appl. No. 15/285,526, mailed on Oct. 12, 2018, 5 pages.
Non-Final Office Action Received for U.S. Appl. No. 15/285,526, dated Mar. 30, 2018, 7 pages.
Notice of Allowance Received for U.S. Appl. No. 15/285,526, dated Mar. 1, 2019, 8 Pages.
Requirement for Restriction/Election Received for U.S. Appl. No. 15/285,526, dated Dec. 13, 2017, 6 pages.
Response after Ex Parte Quayle Action Filed on Oct. 17, 2018 for U.S. Appl. No. 15/285,526, mailed on Oct. 17, 2018, 6 pages.
Response to Election/Restriction Filed on Jan. 8, 2018 for U.S. Appl. No. 15/285,526, dated Dec. 13, 2017, 2 pages.
Response to Non-Final Office Action Filed on Jun. 28, 2018 for U.S. Appl. No. 15/285,526, dated Mar. 30, 2018, 16 pages.

* cited by examiner

| | | Latest Reported Values FY2010 | ESG Goals | Unchanged | Sub Target | December 31st, 2012 Latest Reported | Failed Target | Unchanged | Target Met Coupon |
|---|---|---|---|---|---|---|---|---|---|
| | Indicator Title / Description | | | | | | | | |
| Environmental | Emission Reduction/ CO2 Emissions — Total CO2 and CO2 equivalents emission in kilograms per tonne of cement produced. | 626 | 594.7 | 626 | 657.3 | 589 | 0.05% | 0.00% | -0.05% |
| | Resource Reduction/ Water Use — Total water withdrawal in cubic meters divided by net sales or revenue in US dollars. | 0.0149100687 | 0.014165153 | 0.0149100687 | 0.015665221 | 0.014 | 0.05% | 0.00% | -0.05% |
| | Emission Reduction/ Waste Recycling Ratio — Total recycled and reused waste produced in tonnes divided by total waste produced in tonnes. | 58% | 60.52% | 57.64% | 60.52% | 58% | 0.05% | 0.00% | -0.05% |
| Social | Diversity and Opportunity/ Managers Female Male Ratio — Percentage of women managers. | 19% | 19.95% | 19.00% | 18.05% | 22% | 0.05% | 0.00% | -0.05% |
| | Employment Quality/ Personnel Turnover — Percentage of employee turnover. | 12% | 11.05% | 11.63% | 12.21% | 0.12 | 0.05% | 0.00% | -0.05% |
| | Training and Development/ Training Hours — Average hours of training per year per employee. | 29.8 | 31.29 | 29.8 | 28.31 | 32 | 0.05% | 0.00% | -0.05% |
| Corporate Governance | Board Functions/ Compensation Committee Independence — Percentage of independent board members on the compensation committee as stipulated by the company. | 67% | 70.00% | 66.67% | 63.34% | 62% | 0.05% | 0.00% | -0.05% |
| | Board Functions/ Audit Committee Independence — Percentage of independent board members on the audit committee as stipulated by the company. | 71% | 75.00% | 71.43% | 67.86% | 67% | 0.05% 0.10% | 0.00% | -0.05% -0.20% |
| | Board Structure/ Strictly Independent Board Members — Percentage of strictly independent board members (not employed by the company, not representing or employed by a majority shareholder; not served on the board for more than ten years; not a reference shareholder with more than 5% of holdings; no cross-board membership; no recent, immediate family ties to the corporation; not accepting any compensation other than compensation for board service). | 40% | 42.00% | 40.00% | 38.00% | 40% | | | |

Coupon Fixed At 5% +/- ESG Variable    5.000%    4.900%

| | Indicator Title | Description | Latest Reported Values FY2010 | December 31st 2014 | | | | | | |
|---|---|---|---|---|---|---|---|---|---|---|
| | | | | ESG Goals | Unchanged | Sub Target | Latest Reported | Failed Target | Unchanged | Target Met Coupon |
| Environmental | Emission Reduction/ Cement CO2 Emissions | Total CO2 and CO2 equivalents emission in kilograms per tonne of cement produced. | 626 | 532.1 | 560 | 594.7 | 560 | 0.05% | 0.00% | -0.05% |
| | Resource Reduction/ Water Use | Total water withdrawal in cubic meters divided by net sales or revenue in US dollars. | 0.014510687 | 0.0126749094 | 0.0145 | 0.01248951353 | 0.013 | 0.05% | 0.00% | -0.05% |
| Social | Emission Reduction/ Waste Recycling Ratio | Total recycled and reused waste produced in tonnes divided by total waste produced in tonnes. | 58% | 0.662815982 | 64% | 0.695178986 | 65% | 0.05% | 0.00% | -0.05% |
| | Diversity and Opportunity/ Managers Female Male Ratio | Percentage of women managers. | 19% | 0.2185 | 21% | 0.1995 | 22% | 0.05% | 0.00% | -0.05% |
| | Employment Quality/ Personnel Turnover | Percentage of employee turnover. | 12% | 0.098855 | 9% | 0.110465 | 12% | 0.05% | 0.00% | -0.05% |
| | Training and Development/ Training Hours | Average hours of training per year per employee. | 29.8 | 34.27 | 33 | 31.29 | 35 | 0.05% | 0.00% | -0.05% |
| Corporate Governance | Board Functions/ Compensation Committee Independence | Percentage of independent board members on the compensation committee as stipulated by the company. | 67% | 0.766705 | 74% | 0.700035 | 75% | 0.05% | 0.00% | -0.05% |
| | Board Functions/ Audit Committee Independence | Percentage of independent board members on the audit committee as stipulated by the company. | 71% | 0.821445 | 80% | 0.750015 | 78% | 0.05% | 0.00% | -0.05% |
| | Board Structure/ Strictly Independent Board Members | Percentage of strictly independent board members (not employed by the company; not representing or employed by a majority shareholder; not served on the board for more than ten years; not a reference shareholder with more than 5% of holdings; no cross-board membership; no recent, immediate family ties to the corporation; not accepting any compensation other than compensation for board service). | 40% | 0.46 | 40% | 0.42 | 50% | 0.05% | 0.00% | -0.05% |
| | | | | | | | | 0.05% | 0.00% | -0.15% |

Coupon Fixed At 5% +/- ESG Variable 5.000%     4.900%

ENVIRONMENTAL, SOCIAL AND CORPORATE GOVERNANCE LINKED DEBT INSTRUMENTS

REFERENCE TO RELATED APPLICATIONS INFORMATION

This present application is a divisional application of U.S. patent application Ser. No. 15/285,526, filed on Oct. 5, 2016, now U.S. Pat. No. 10,346,920, issued on Jul. 9, 2019, which further claims priority to U.S. patent application Ser. No. 13/768,058, filed on Feb. 15, 2013, now U.S. Pat. No. 9,466,084, issued on Oct. 11, 2016, which are incorporated herein by reference in their entirety.

TECHNICAL FIELD

This disclosure relates to fixed-income securities, and more particularly to fixed-income securities linked to environmental, social and governance factors.

BACKGROUND

Fixed-income securities comprise bonds and other short- and long-term, fixed-return debt instruments issued by a wide range of institutions, including national and local governments, quasi-governmental bodies, public and private corporations, and large nonprofit organizations.

Fixed-income securities have been generally regarded as one of the safer, more conservative investment opportunities and have served as core holdings for many institutional investors and wealth investors. Various fixed-income securities are issued to finance specific projects, such as infrastructure building, and thus have clearly identifiable purposes, while other fixed-income securities have funded the general activities of governments and corporations thereby providing unique opportunities for responsible investors to participate in the creation of public goods, infrastructure, and long-term corporate assets.

Today, responsible investment in fixed-income securities includes an analysis of the Environmental, Social, and Corporate Governance (ESG) factors associated with issuers to obtain a better understanding of financial risks and opportunities. This may include an analysis of the collateral benefits caused by such investments, as well as harms caused to society based on such investments. Typically, the analysis entails the gathering and weighting of ESG factors not included in traditional fixed-income analysis.

While today's rating agencies play a fundamental role in determining credit risk associated with fixed-income securities, rating agencies generally do not integrate ESG factors into their analysis. In addition, the gathering and weighting of ESG factors affecting a fixed-income security can be a time consuming and arduous task. Further, although most responsible investors are under increasing regulatory mandates to invest responsibly, most do not have means for performing ESG analysis of issuers without going to specialist providers, resulting in additional costs to responsible investors on ever tightening procurement budgets.

Accordingly, there exists a need for improved products, systems and techniques for responsible investment.

SUMMARY

Systems and techniques for structuring and analyzing a fixed-income security are disclosed. The fixed-income security includes a coupon that provides at least a variable rate of interest payment over a time interval. The variable rate of interest payment may be based at least in part on a set of environmental, social, and governance ("ESG") goals defined for an issuer over the time interval. A set of ESG values associated with performance of the issuer and corresponding to the set of ESG goals may be reported, independently audited, and used to determine the variable rate of interest payment provided by the security.

Various aspects of the systems and techniques relate to determining whether an issuer has accomplished a set of pre-defined ESG goals and computing a cash flow associated with an investment based on such accomplishments.

For example, according to one aspect, a computer-implemented method includes determining whether an entity has accomplished a set of ESG goals associated with a bond within a first time interval, the bond having a current coupon rate. If the entity has accomplished the set of ESG goals, the method includes automatically adjusting the current coupon rate of the bond to a first coupon rate which is less than the current coupon rate. If the entity has not accomplished the set of ESG goals, the method includes automatically adjusting the current coupon rate of the bond to a second coupon rate which exceeds the current coupon rate. The method also includes associating a signal with the adjusted current coupon rate and transmitting the signal.

In one embodiment, for example, the method also includes determining whether the entity has accomplished a second set of ESG goals associated with a second time interval. If the entity has accomplished the second set of ESG goals, automatically adjusting the current coupon rate of the bond to a third coupon rate which is less than the current coupon rate. If the entity has not accomplished the second set of ESG goals, the method includes automatically adjusting the current coupon rate of the bond to a fourth coupon rate which exceeds the current coupon rate, wherein the second time interval is subsequent to the first time interval and before a maturity date of the bond.

In yet another aspect, a computer-implemented method includes automatically associating a set of ESG goals with a security, the set of ESG goals being associated with an entity and a first time frame, the security providing a first cash flow dependent upon accomplishment of the set of ESG goals over the first time frame. The method also includes determining whether the entity accomplished the set of ESG goals over the first time interval, and adjusting automatically the first cash flow based on the determination of whether the entity accomplished the set of ESG goals over the first time interval.

A system, as well as articles that include a machine-readable medium storing machine-readable instructions for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4-6 illustrate an example coupon matrix associated with a fixed-income investment linked to environmental, social and governance factors.

Like reference symbols in the various drawings indicate like elements.

DETAILED DESCRIPTION

The present disclosure includes methods and systems which facilitate the generation and valuation of fixed-income securities that are linked to environmental, social and governance factors. The methods and systems are particularly beneficial in scenarios in which investors need to gather and weight Environmental, Social and Governance (ESG) factors affecting a fixed-income security and may be used to determine the social and/or environmental impact an issuer of such investments may have on society. ESG factors refer to a subset of non-financial performance indicators that includes sustainable, ethical, and corporate governance issues such as managing an entity's carbon footprint and ensuring there are systems in corporate systems in place to ensure accountability.

The present disclosure may also be advantageous in valuing any security that provides a cash flow based at least in part on an entity, such as an issuer of a security or other third party, achieving a set of predefined ESG goals. Example cash flows include, but are not limited to, one or more coupon or balloon payments, annual or otherwise, provided by a security.

Figure 1:
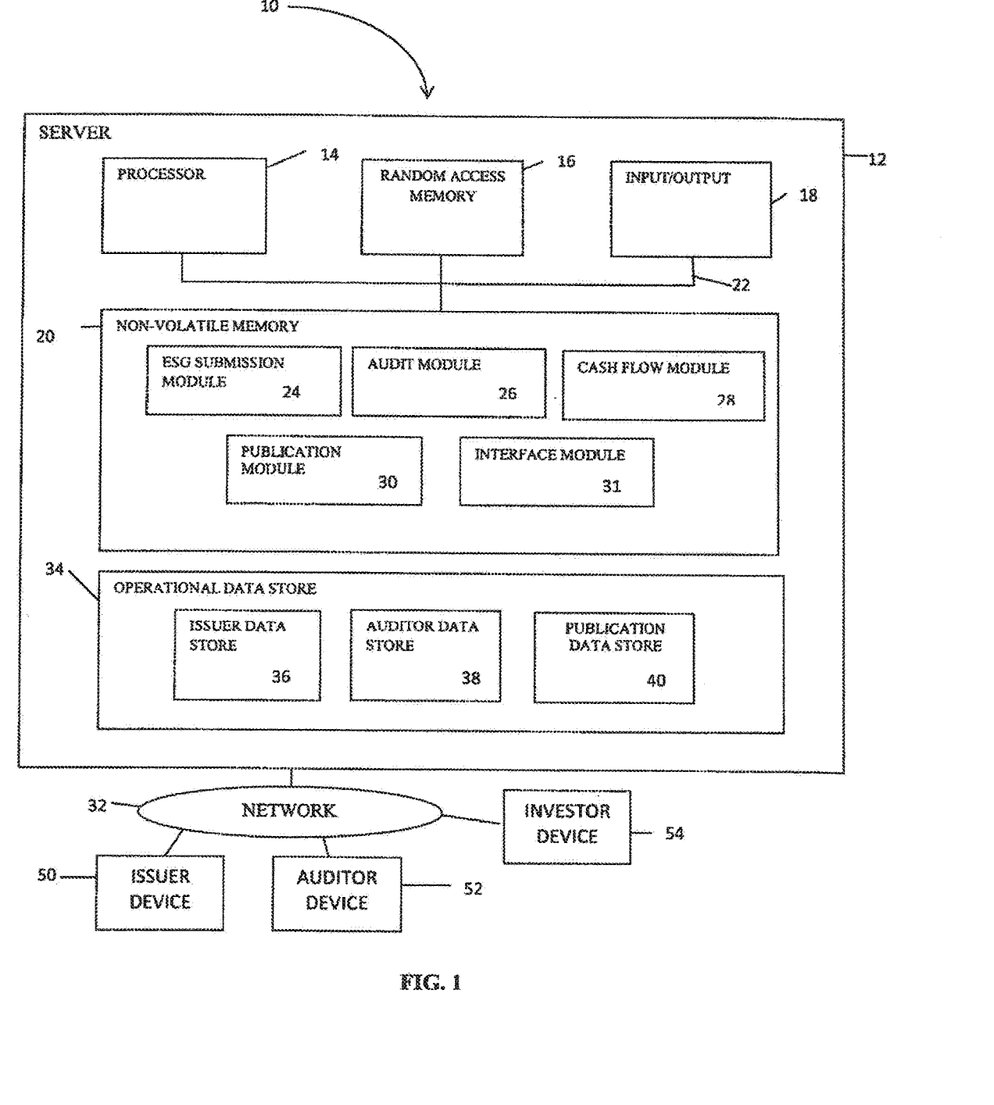
FIG. 1 is a schematic of a computer-based system for generating and valuing a fixed-income investment linked to environmental, social and governance factors.

Turning now to FIG. 1, a block diagram of a suitable computer system 10 within which embodiments of the disclosure may be implemented is disclosed. The system 10 is only one example and is not intended to suggest any limitation as to the scope of use or functionality of the invention. Neither should the system 10 be interpreted as having any dependency or requirement relating to any one or combination of illustrated components.

The system 10 provides a platform by which auditors, issuers, and investors may trade and analyze ESG linked securities. ESG linked securities are securities in which at least a portion of a cash flow provided by such security is dependent upon ESG factors. The system 10 may be used by issuers to disclose achieved ESG indicator values associated with their respective businesses and by auditors to verify and publish achieved ESG indicator values associated with the business. The system 10 also may be used to automatically adjust interest rates associated with ESG linked securities, resulting in one or more varying cash flows provided by securities based on audited ESG indicator values, as well as be used by investors to trade and analyze ESG linked securities processed by the system 10.

The system 10 shown in FIG. 1 may be operational with numerous other general purpose or special purpose computing consumer electronics, network PCs, minicomputers, mainframe computers, laptop computers, as well as distributed computing environments that include any of the above systems or devices, and the like.

In one embodiment, the system 10 is implemented using computer-executable instructions, such as program modules, being executed by a computer. Generally, program modules include routines, programs, objects, components, data structures, loop code segments and constructs, etc. that perform particular tasks or implement particular abstract data types. In another embodiment, the system 10 is implemented in a distributed computing environment where tasks are performed by remote processing devices linked through a communications network. The program modules may be located in both local and remote computer storage media including memory storage devices, and tasks are performed by the programs and modules described below with the aid of figures. Those skilled in the art can implement the description and figures as processor executable instructions, which can be written on any form of a computer readable media.

As shown in the FIG. 1 example, the system 10 may include a server device 12 configured to include a processor 14, such as a central processing unit ('CPU'), random access memory ('RAM') 16, one or more input-output devices 18, such as a display device (not shown) and keyboard (not shown), and non-volatile memory 20, all of which are interconnected via a common bus 22 and controlled by the processor 14.

As shown in the FIG. 1 example, in one embodiment, the non-volatile memory 20 is configured to include an ESG submission module 24 for obtaining and storing ESG indicator values submitted by issuers, an audit module 26 for use by auditors to verify submitted ESG indicator values, and a cash flow module 28 for determining and automatically adjusting a variable interest rate associated with an ESG linked financial investment. In addition, the non-volatile memory 20 includes a publication module 30 that allows audited ESG indicator values to be made available to investors, and an interface module 31 that provides one or more graphical user interfaces for use by users of the system 10. Additional details of the ESG submission module 24, the audit module 26, the cash flow module 28, the publication module 30, and the interface module 31 are discussed in greater detail below.

The network 32 can include various devices such as routers, server, and switching elements connected in an Intranet, Extranet or Internet configuration. In one embodiment, the network 32 uses wired communications to transfer information between an issuer device 50, an auditor device 52, an investor device 54, and the server device 12. In another embodiment, the network 32 employs wireless communication protocols to transfer information between the issuer device 50, the auditor device 52, the investor device 54, and the server device 12. In yet other embodiments, the network 32 employs a combination of wired and wireless technologies to transfer information between the issuer device 50, the auditor device 52, the investor device 54, and the server device 12.

The issuer device 50, the auditor device 52, and the investor device 54 are computer access devices that are in communication with the server 12 over the network 32 via the interface module 31. The interface module 31 provides one or more graphical user interfaces on such access devices allowing users of the system 10 to interact with the beforementioned software modules 24, 26, 28 and 30. Access devices 50, 52, 54 may include a personal computer, laptop computer, or other type of electronic device, such as a cellular phone, smart phone, or Personal Digital Assistant (PDA). In one embodiment, for example, access devices 50, 52, 54 are coupled to I/O devices (not shown) that include keyboards each in combination with a pointing device such as a mouse for sending web page requests to the server 12. Preferably, memory of each access device 50, 52, 54 is configured to include a web browser that is used to request and receive information from the server 12. Although only three access devices 50, 52, 54 are shown in FIG. 1, the system is not limited to three access devices and can support multiple access devices.

The operational data store 34 is a repository that maintains and stores information utilized by the software modules 24, 26, 28, 30, and 31. In one embodiment, the operational data store 34 is a relational database. In another embodiment, the operational data store 34 is a directory server, such as a Lightweight Directory Access Protocol ('LDAP'). In yet another embodiment, the operational data store 34 is an area of non-volatile memory 20 of the server 12.

As shown in FIG. 1, in one embodiment, the operational data store 34 includes an issuer data store 36 for storing ESG indicator values submitted by an issuer of an ESG-linked security, an auditor data store 38 for storing audited ESG indicator values submitted by an issuer, and a publication data store 40 that allows access to investors of audited ESG indicator values.

Although the operational data store 34 shown in FIG. 1 is connected to the network 32, it will be appreciated by one skilled in the art that the operational data store 34 and/or any of the data stores 36, 38, 40 shown in FIG. 1, may be distributed across various servers and be accessible to the server 12 over the network 32, be coupled directly to the server 12, or be configured in an area of non-volatile memory 20 of the server 12.

Further, it should be noted that the system 10 shown in FIG. 1 is one embodiment of the disclosure. Other system embodiments of the disclosure may include additional structures that are not shown, such as secondary storage and additional computational devices. In addition, various other embodiments of the disclosure may include fewer structures than those shown in FIG. 1. For example, in one embodiment, the disclosure is implemented on a single computing device in a non-networked standalone configuration.

Figure 2:
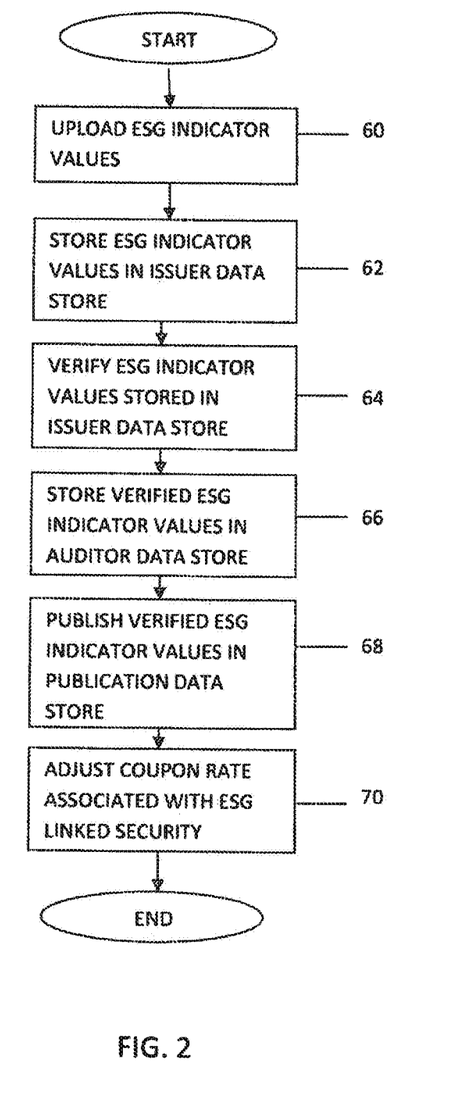
FIG. 2 illustrates an exemplary method of processing a fixed-income investment linked to environmental, social and governance factors.

Turning now to FIG. 2, an example method of processing an ESG-linked security is disclosed. In one embodiment, the method includes auditing and publishing ESG indicator values associated with an issuer, normalizing ESG indicator values by one or more metrics, such as by company size, and computing a cash flow for the ESG-linked security based on audited ESG indicator values. In the example shown in FIG. 2, steps 60-62 are executed by the ESG submission module 24, steps 64-66 are executed by the audit module 26, step 68 is executed by the publication module 30, and step 70 is executed by the cash flow module 70.

For example, at step 60 of FIG. 2, an issuer first uploads a set of ESG indicator values into the system using the ESG submission module 24. ESG indicator values are metric data values associated with ESG factors. Example ESG factors used in the system may include, but are not limited to, climate change and the emissions intensity of assets, the environmental impact of assets—for example, mining or resource extraction in environmentally sensitive areas, executive remuneration, board independence, and whether a an entity or asset has unacceptable business practices—for example, a poor occupational health and safety record, a poor environmental performance record, or the entity engages in such practices, such as child labor. Example ESG factors and indicator values are further disclosed in connection with FIGS. 4-6.

The ESG submission module 24 may be accessible to the issuer via one or more access devices, such as the issuer device 50, using the interface module 31. In one embodiment, the ESG submission module 24 associates the set of ESG indicator values with a set of predefined ESG goals associated with an issuer of the security. The pre-defined set of ESG goals may be agreed upon between an underwriter and issuer prior to issuing the ESG linked security. Next, at step 62, once the set of ESG indicator values are associated, the ESG submission module 24 stores the associated set of ESG indicator values in the issuer data store 40. In one embodiment, the cash flow module 28 computes a fee amount for storing the associated set of ESG indicator values based on at least a scheduled portion of a cash flow provided by the ESG-linked security. In another embodiment, the cash flow module 28 computes the fee amount based on a previously defined fixed fee amount for storing the associated set of ESG indicator values. In yet another embodiment, the cash flow module 28 computes the fee amount based on an issue amount associated with the ESG-linked security.

Next, at step 64, the auditor module 26 verifies the stored ESG indicator values. The auditor module 26 may be configured to include Generally Accepted Accounting Principles (GAAP) processes to aid in auditing of ESG indicator values submitted by issuers. Of course, as will be appreciated by one skilled in the art, other accounting standards processes may be incorporated into the audit module 26. In one embodiment, an auditor using the auditor device 52 accesses and verifies the stored ESG data values using the auditor module 26.

Once ESG indicator values are verified, at step 66, the auditor module 26 stores the verified ESG indicator values in the auditor data store 36. In one embodiment, the auditor module 26 then computes a fee associated with auditing the ESG indicator values. The fee may be based on a portion of the cash flow provided by the ESG linked security, be a fixed fee amount, and/or be based on an issue amount associated with the ESG linked security.

Once the verified set of ESG factors are stored in the auditor data store 36, referring to step 68, the publication module 30 stores the verified ESG indicator values to the publication data store 40 which may be accessible to users of the system 10. In one embodiment, the publication module 30 stores the verified ESG indicator values in the publication data store 40 and provides read access to such data via access devices, such as the investor device 54. In various embodiments, the publication module 30 may also compute a fee for publishing the verified ESG indicator values to the publication data store 40. The computed fee may be based on a portion of a cash flow provided by the ESG-linked security, a pre-defined (e.g., fixed) fee amount, and/or be based on an issue amount (e.g., face amount) associated with the ESG-linked security.

Lastly, as shown at step 70, the cash flow module 28 adjusts the coupon rate associated with the ESG-linked security by comparing the verified ESG indicator values to a corresponding set of pre-defined ESG goal data. As discussed herein, the coupon rate of the security refers to an amount of interest paid (e.g., cash flow) over a time interval (e.g., a year) expressed as a percentage of the face value of the security. For example, in one embodiment, the coupon rate identifies the amount of interest paid per year by the ESG-linked security expressed as a percentage of the face value of the ESG-linked security. The coupon rate may be a variable interest rate over a time period or a combination of fixed and variable interest rates payable over a time interval.

Figure 3:
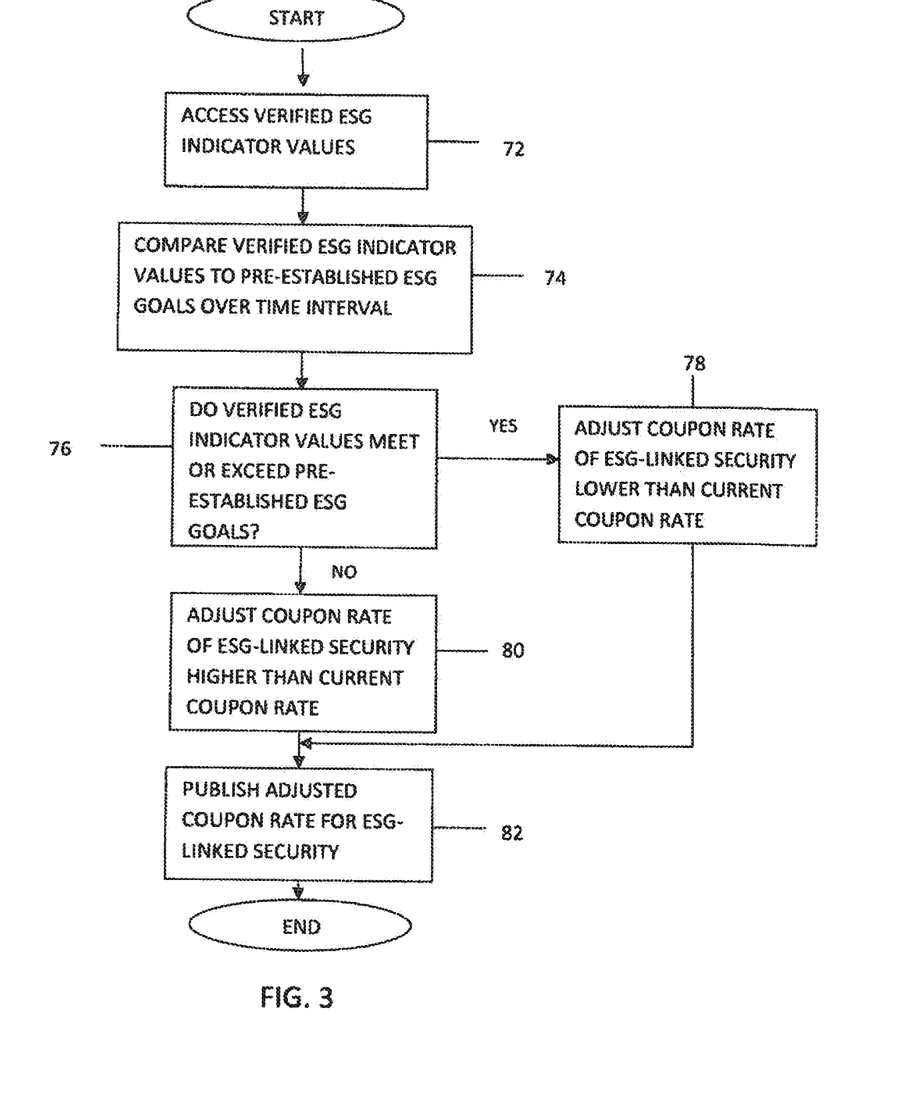
FIG. 3 illustrates an exemplary method of adjusting a coupon rate associated with a fixed-income investment linked to environmental, social and governance factors.

FIG. 3 illustrates an example method executed by the cash flow module 28 to adjust the current coupon rate of an ESG-linked security. In one embodiment, as shown at step 72, the cash flow module 28 accesses a set of verified ESG indicator values associated with an issuer from the publication data store 40. Next, once the verified set of ESG indicator values are accessed, at step 74, the cash flow module 28 compares the verified ESG indicator values to corresponding ESG goals in the set of pre-defined ESG goal data for the issuer. Each item of the set of pre-defined ESG goal data may be associated with set time intervals. For example, in one embodiment, the set of ESG goal data is annual data and represents optimal ESG factor data values an issuer of the ESG-linked security intends to achieve. The pre-defined ESG goal data may be agreed to between an issuer and underwriter prior to issuance of the ESG linked security. In one embodiment, the cash flow module 28 stores the verified ESG indicator values and the pre-defined ESG goal data in one or more coupon matrices associated with the issuer. An example coupon matrix stored by the cash flow module 28 is disclosed in connection with FIGS. 4-6.

Referring to FIG. 3, at step 76, the cash flow module 28 determines whether an entity associated with the ESG-linked security, such as the issuer, achieved the set of pre-defined ESG goals defined for the entity over a particular time period. In one embodiment, the cash flow module 28 determines whether the entity achieved the set of pre-defined ESG goals by comparing the set of ESG verified indicator values to corresponding ESG goal data in the set of pre-defined ESG goal data associated with the issuer. If the set of verified ESG indicator values, in the aggregate, meet or exceed the set of predefined ESG goal data, at step 78, the cash flow module 28 computes a new current coupon rate for the ESG-linked security by adjusting the current coupon rate of the ESG-linked security to a lower interest rate. If the cash flow module 28 determines that the set of verified ESG indicator values, in the aggregate, do not meet or exceed the set of pre-defined ESG goal data associated with the issuer, at step 80, the cash flow module 28 computes a new current coupon rate for the ESG-linked security by adjusting the current coupon rate of the ESG-linked security to a higher interest rate.

Lastly, at step 82, the cash flow module 28 publishes the adjusted coupon rate of the ESG-linked security to the publication data store 40. In one embodiment, the cash flow module 28 publishes the adjustments made to the coupon rate in a coupon matrix which is stored in the publication data store 40. The cash flow module 28 also may compute a fee amount for publishing the adjusted coupon rate. The fee amount may be based on a portion of a cash flow provided by the ESG-linked security, a fixed fee amount, and/or be based on an issue amount (e.g., face amount) associated with the ESG-linked security.

Figure 5:
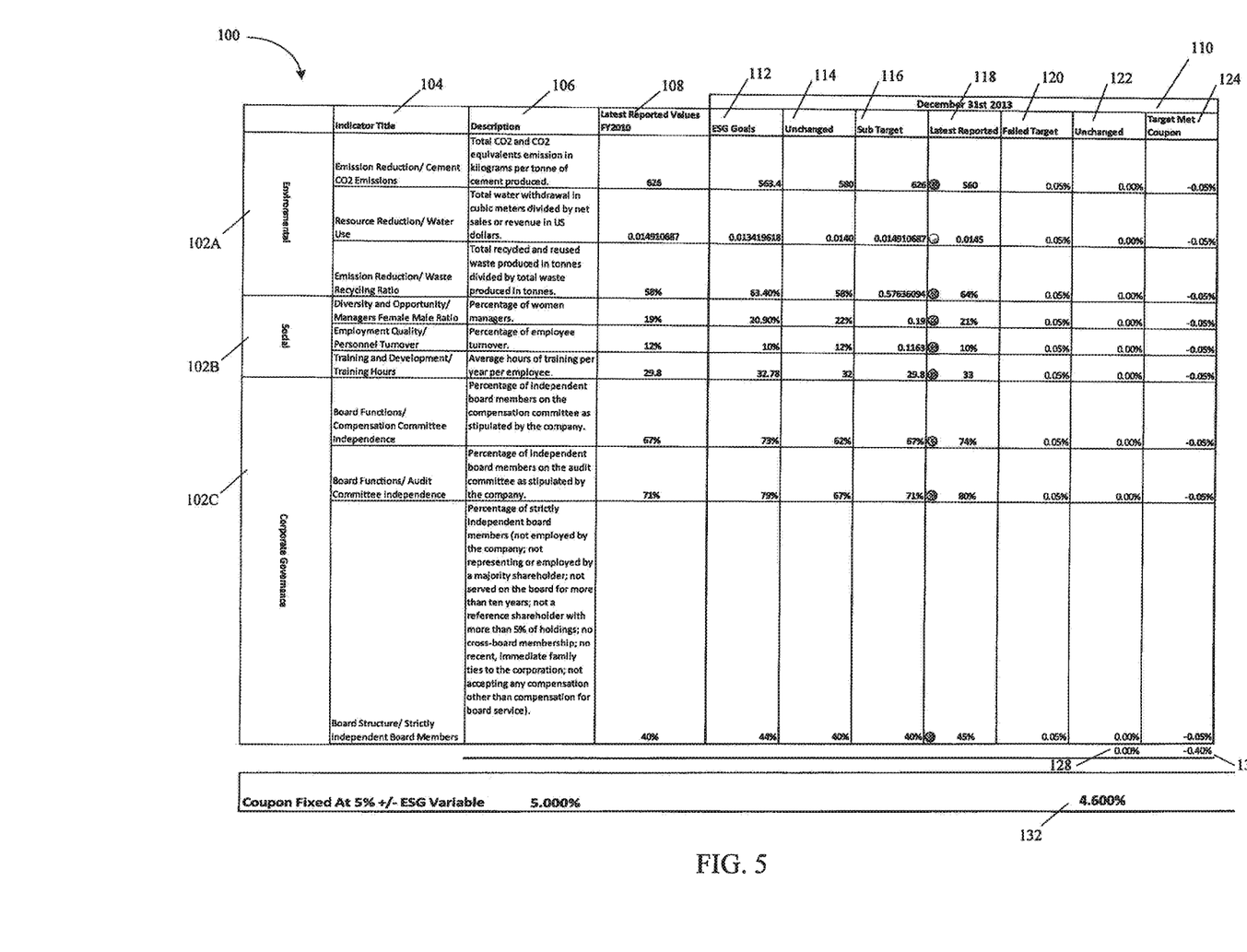
Figure 6:
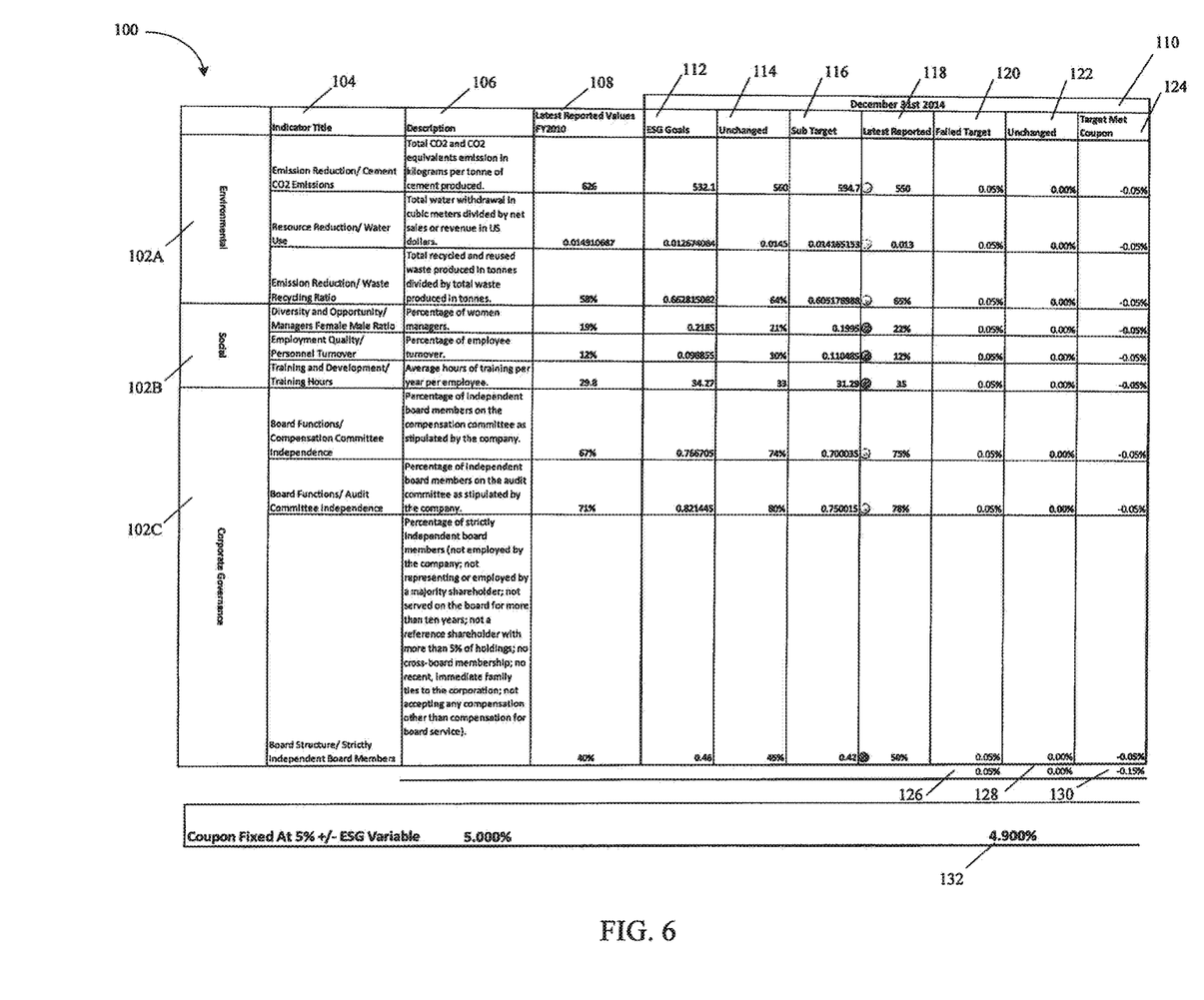

An example coupon matrix 100 generated by the cash flow module 28 is disclosed in connection with FIGS. 4-6. The coupon matrix 100 may be utilized by investors of the ESG-linked security to identify which particular ESG factors are having a positive or negative effect on the cash flows provided by the security.

Example data values shown in the matrix 100 of FIGS. 4-6 are based on an example ESG-linked bond having a three (3) year maturity and a one-thousand dollar ($1,000) face value. The ESG-linked bond includes both a fixed coupon rate (5%) and a variable coupon rate (5%). The fixed coupon rate identifies a predetermined cash flow amount provided by the security over a set time interval, regardless of pre-defined ESG goals being achieved. The variable coupon rate identifies an additional cash flow amount provided by the security that is dependent upon pre-defined ESG goals being achieved over a time interval. With respect to the example security discussed herein, a summation of the fixed coupon rate and variable coupon rate refers to the coupon rate of the security. Of course, as will be appreciated by one skilled in the art, the present disclosure is not limited to a security having both a fixed and variable coupon rate and may be utilized in developing and analyzing any security providing a variable cash flow.

As shown in the FIG. 4-6 example, the matrix 100 includes one or more environmental factors 102A, social factors 102B, and corporate governance factors 102C that may be associated with and affect the cash flow provided by the ESG-linked security.

Each ESG factor is associated with a title 104, a description 106, and a last reported fiscal year value 108 for the factor. In addition, for each time period in which the ESG-linked security provides a cash flow, each ESG factor is also associated with a pre-defined ESG goal value 112, a previous reported ESG indicator value 114, a sub-target ESG goal value 116, and a current reported indicator value 118.

In the example shown in FIGS. 4-6, the matrix 100 also includes scheduled values 120, 122, 124 that specify an interest rate adjustment by which the cash flow module 28 is to adjust the current variable coupon rate of the security. The adjustment is based on computing whether the issuer failed or achieved pre-defined ESG goals. As noted previously, each of the ESG factors may contribute to the variable coupon rate provided by the security, and the scheduled values 120, 122, 124 are typically negotiated between an underwriter and issuer prior to issuance of the security.

For example, referring now to the 'Emission Reduction' ESG factor shown in FIG. 4, the cash flow module 28 will increase the variable coupon rate by '0.05%' if the latest reported indicator value associated with the 'Emission Reduction' ESG factor does not meet or exceed its associated pre-defined ESG goal value. As shown in the matrix 100, the cash flow module 28 will not adjust the variable coupon rate if the latest reported indicator value remains unchanged (0.00%) from a prior period, and will decrease the variable coupon rate if the latest reported indicator value meets or exceeds the pre-defined ESG goal value. In one embodiment, upon a coupon rate adjustment being determined due to a factor, the cash flow module 28 sets a visual indicator in the matrix 100 indicating that an adjustment relating to a particular ESG factor has been made. The visual indicator shown in the matrix 100 may be a change in background color, foreground color, font, or inclusion of icons associated with the ESG factor. The cash flow module 28 may also include audio indicators in the matrix 100 to identify which particular ESG factor is contributing to the adjustment.

Once all of the ESG factors and associated scheduled values are determined by the cash flow module 28, in one embodiment, the cash flow module aggregates the variable coupon rate adjustments to be made. For example, referring to FIG. 4, in the period ending 'Dec. 31, 2012', the cash flow module 28 computed the aggregate changes for failed ESG activities to be '0.10%' 126. The cash flow module 28 also computed the aggregate changes for unchanged activity to be '0.00%', and the aggregate changes for achieved goals to be '−0.20%'. The cash flow module 28 then sums these adjustments to compute a new variable coupon rate for the security. In the example shown in FIG. 4, the sum of these adjustments is '−0.10%' resulting in a new current variable coupon rate for the security of '4.900%' 132. FIG. 5 illustrates similar calculations for the period ending 'Dec. 31, 2013', and FIG. 6 illustrates similar computations for the period ending 'Dec. 31, 2014'.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A system comprising:
a data store;
a server including a processor and memory storing instructions that, in response to receiving a request for access to a service and a set of values associated with an entity corresponding to a set of Environmental, Social, and Corporate Governance (ESG) goals, cause the processor to compute a fee amount for publishing, to the data store, a set of values corresponding to the set of ESG goals associated with an issuer of an ESG linked security, wherein the processor:
audits the set of values corresponding to the set of ESG goals, the auditing performed by an audit module configured to include accounting standards processes for use in the auditing;
normalizes the set of audited values corresponding to the set of ESG goals by one or more predefined metrics;
publishes the normalized set of values corresponding to the set of ESG goals
associates the set of normalized values corresponding to the set of ESG goals with a security, the set of ESG goals further associated with a first time frame, the security providing a first cash flow dependent upon accomplishment of the set of ESG goals over the first time frame;
determines whether the entity accomplished the set of ESG goals over a first time interval, said determination further comprising a comparison of the set of normalized values corresponding to the set of ESG goals to a set of pre-defined ESG goals received from an issuer device;
adjusts the first cash flow based on the determination of whether the entity accomplished the set of ESG goals over the first time interval; and
publishes the adjusted cash flow.

2. The system of claim 1 wherein the memory stores instructions that, in response to receiving the request, cause the processor to:
provide a second cash flow dependent upon a maturity date associated with the security.

3. The system of claim 1, wherein the processor further computes a first fee amount for publishing the set of values corresponding to the set of ESG goals.

4. The system of claim 1, wherein the first cash flow comprises a fixed rate portion and a variable rate portion, the fixed rate portion being a pre-defined payment amount and the variable rate portion being a variable payment amount dependent upon whether the entity accomplished the set of ESG goals over the first time interval.

5. The system of claim 2, wherein the second cash flow is subsequent to the first cash flow.

6. The system of claim 3, wherein the first fee amount is a fixed fee amount.

7. The system of claim 3, wherein the first fee amount varies based on an issue amount associated with the security.

8. The system of claim 3, wherein at least a portion of the first fee amount is based on the set of ESG goals.

9. The system of claim 3, further computes a second fee amount for auditing the set of values corresponding to the set of ESG goals.

10. The system of claim 3, wherein the first fee amount is based on at least a scheduled portion of the first cash flow.

11. The system of claim 8, wherein the processor transmits at least one portion of the first cash flow to an auditor and at least a second portion of the first cash flow to a publisher.

12. The system of claim 9, wherein at least a portion of the second fee amount is based on the set of ESG goals.

13. The system of claim 9, wherein the second fee amount is based on at least a scheduled portion of the first cash flow.

14. The system of claim 9, wherein the second fee amount is a fixed fee amount.

15. The system of claim 9, wherein the second fee amount varies based on an issue amount associated with the security.

* * * * *